(12) United States Patent
Konietzko (10) Patent No.: US 10,239,030 B2
(45) Date of Patent: Mar. 26, 2019

(54) PHARMACY FORMULATION PRODUCTION SYSTEM AND PHARMACY FORMULATION PRODUCTION METHOD FOR PRODUCING PHARMACEUTICAL INDIVIDUAL FORMULATIONS

(71) Applicant: GAKO International GmbH, München (DE)

(72) Inventor: Matthias Konietzko, Bamberg (DE)

(73) Assignee: GAKO International GmbH, München (DE)

( * ) Notice: Subject to any disclaimer, the term of this patent is extended or adjusted under 35 U.S.C. 154(b) by 109 days.

(21) Appl. No.: 15/307,651

(22) PCT Filed: Apr. 29, 2015

(86) PCT No.: PCT/EP2015/059304
§ 371 (c)(1),
(2) Date: Oct. 28, 2016

(87) PCT Pub. No.: WO2015/165943
PCT Pub. Date: Nov. 5, 2015

(65) Prior Publication Data
US 2017/0050157 A1   Feb. 23, 2017

(30) Foreign Application Priority Data
Apr. 29, 2014   (DE) .......................... 10 2014 105 989

(51) Int. Cl.
*B01F 7/16*   (2006.01)
*B01F 13/10*   (2006.01)
(Continued)

(52) U.S. Cl.
CPC ............. *B01F 13/1066* (2013.01); *A61J 3/00* (2013.01); *B01F 7/1605* (2013.01);
(Continued)

(58) Field of Classification Search
CPC ...... A61J 3/00; B01F 13/1066; B01F 13/1069; B01F 15/0445; B01F 2215/0032; B01F 7/1605; G06Q 10/0875
See application file for complete search history.

(56) References Cited

U.S. PATENT DOCUMENTS 5,392,952 A * 2/1995 Bowden ................ A61J 7/0481
221/15
5,472,113 A * 12/1995 Shaw .................... A61J 7/0084
221/15

(Continued)

FOREIGN PATENT DOCUMENTS

WO   02/073142 A1   9/2002
WO   2011/036098 A1   3/2011
WO   2012/112497 A2   8/2012

OTHER PUBLICATIONS

International Search Report for PCT/EP2015/059304 dated Jul. 14, 2015.

*Primary Examiner* — Tony G Soohoo
(74) *Attorney, Agent, or Firm* — Bachman & LaPointe, P.C.

(57) ABSTRACT

A pharmacy formulation preparation system (2) for preparing individual pharmaceutical formulations such as formulations for ointments, semisolid preparations, eye drops, lotions, pills, capsules or teas in quantities of up to 5 kg, according to the invention comprises: reading means (8); weighing means (12); mixing means (14), in particular a stirrer having a drive and a mixing container; display means (10); a data processing unit (4) adapted to have access to data in a pharmacy-associated stock database area (6); a preparation database (18) comprising composition information; and that for the read-in individual prescription data of an individual prescription, by accessing the preparation database (18), the raw materials required for preparing the (Continued)

individual prescription and the respective quantities thereof as well as the time period, the processing devices and the procedure parameters of the mixing procedure can be determined.

11 Claims, 7 Drawing Sheets

(51) Int. Cl.
    *B01F 15/04*     (2006.01)
    *A61J 3/00*     (2006.01)
    *G06Q 10/08*     (2012.01)

(52) U.S. Cl.
    CPC ...... *B01F 13/1069* (2013.01); *B01F 15/0425* (2013.01); *B01F 15/0445* (2013.01); *G06Q 10/0875* (2013.01); *B01F 13/10* (2013.01); *B01F 2215/0032* (2013.01)

(56) References Cited

U.S. PATENT DOCUMENTS

| | | | | |
|---|---|---|---|---|
| 5,487,603 | A * | 1/1996 | Hoff | B01F 15/00253 222/58 |
| 5,612,869 | A * | 3/1997 | Letzt | G06Q 10/10 705/3 |
| 5,797,515 | A * | 8/1998 | Liff | G06F 19/3462 221/2 |
| 5,950,630 | A * | 9/1999 | Portwood | G06F 19/3456 128/897 |
| 5,971,594 | A * | 10/1999 | Sahai | A61J 7/0481 700/242 |
| 6,101,452 | A * | 8/2000 | Krall | B67D 1/1234 137/101.25 |
| 6,332,100 | B1 * | 12/2001 | Sahai | A61J 7/0481 700/242 |
| 6,611,733 | B1 * | 8/2003 | De La Huerga | A61J 1/1437 700/236 |
| 7,119,689 | B2 * | 10/2006 | Mallett | G06F 19/00 340/572.1 |
| 7,206,664 | B2 * | 4/2007 | Schmid | B01F 13/1055 700/239 |
| 8,990,099 | B2 * | 3/2015 | MacDonald | G06Q 50/22 705/2 |
| 2001/0001144 | A1 * | 5/2001 | Kapp | G06F 19/326 705/3 |
| 2002/0032582 | A1 * | 3/2002 | Feeney, Jr. | G06F 19/3462 705/2 |
| 2002/0035412 | A1 | 3/2002 | Kircher et al. | |
| 2002/0198742 | A1 * | 12/2002 | Kameda | G06Q 10/10 705/3 |
| 2003/0074223 | A1 * | 4/2003 | Hickle | A61J 1/14 705/2 |
| 2003/0105552 | A1 * | 6/2003 | Lunak | B65G 1/12 700/214 |
| 2003/0216974 | A1 * | 11/2003 | Browne | G06Q 10/08 705/28 |
| 2003/0220822 | A1 * | 11/2003 | Fiala | G06F 19/328 705/3 |
| 2004/0002872 | A1 * | 1/2004 | Wright | G06F 19/3418 705/2 |
| 2004/0133306 | A1 | 7/2004 | Schmid | |
| 2004/0153415 | A1 * | 8/2004 | Adkins | G06Q 20/3674 705/59 |
| 2004/0155780 | A1 * | 8/2004 | Rapchak | G06F 19/00 340/573.1 |
| 2004/0158507 | A1 * | 8/2004 | Meek, Jr. | G06Q 10/087 705/28 |
| 2004/0188998 | A1 * | 9/2004 | Henthorn | A61J 7/04 283/115 |
| 2005/0021367 | A1 * | 1/2005 | Saeger | G06F 19/3456 705/2 |
| 2005/0055242 | A1 * | 3/2005 | Bello | G06Q 50/22 705/2 |
| 2005/0096941 | A1 * | 5/2005 | Tong | G06Q 50/22 705/2 |
| 2006/0192001 | A1 * | 8/2006 | Shaffer | G06Q 10/087 235/385 |
| 2006/0224419 | A1 * | 10/2006 | Servizio | G06F 19/3456 705/2 |
| 2007/0023512 | A1 * | 2/2007 | Miller | G06Q 10/087 235/385 |
| 2007/0173971 | A1 * | 7/2007 | Richardson | G06F 19/3462 700/231 |
| 2007/0185615 | A1 * | 8/2007 | Bossi | G06F 19/3462 700/244 |
| 2008/0272138 | A1 * | 11/2008 | Ross | G06F 19/3462 221/1 |
| 2009/0012820 | A1 * | 1/2009 | Bishop | G06Q 10/087 705/3 |
| 2009/0048863 | A1 * | 2/2009 | Kozlowski | G06Q 10/10 705/2 |
| 2010/0280895 | A1 * | 11/2010 | Mottola | G06F 19/324 705/14.24 |
| 2012/0269029 | A1 | 10/2012 | Konietzko et al. | |
| 2014/0040081 | A1 * | 2/2014 | Marwah | G06Q 10/0875 705/29 |

\* cited by examiner

PHARMACY FORMULATION PRODUCTION SYSTEM AND PHARMACY FORMULATION PRODUCTION METHOD FOR PRODUCING PHARMACEUTICAL INDIVIDUAL FORMULATIONS

BACKGROUND

The present invention concerns a pharmacy formulation preparation system and a pharmacy formulation preparation method for preparing individual pharmaceutical formulations.

At the present time, individual pharmaceutical formulations are often prepared manually by pharmacists. As a result, the preparation of such individual formulations is often defective and tedious and there is often a delay in identifying missing materials that are required for preparing such individual formulations. In addition, the actually prepared individual formulation often differs from the specified formulation.

It is therefore an object of the present invention to provide a more efficient system and method for preparing individual pharmaceutical formulations such as formulations for ointments, semisolid preparations, eye drops, lotions, pills, capsules or teas in quantities of up to 5 kg, which allow for avoiding to a great extent delays and mistakes during the preparation.

The pharmacy sector in Germany and other European countries is very heterogeneous; in Germany, for example, a person is only allowed to direct a maximum of 3 pharmacies. For this reason, the preparation of individual formulations is usually performed manually using the pharmacist's expert knowledge, which might differ from pharmacist to pharmacist and from pharmacy to pharmacy. In addition to that, the pharmacist often consults reference books at their disposal.

According to a finding underlying the invention, the demand for an improved and standardized system has so far not been determined because each pharmacy has so far mixed individual formulations according to their own system. The inventors of the subject matter of the present patent application have determined this need and the present invention provides a significant improvement.

SUMMARY

This object is achieved by the subject matter of independent claim 1. Advantageous embodiments result from the dependent claims.

An inventive pharmacy formulation preparation system for preparing individual pharmaceutical formulations such as formulations for ointments, semisolid preparations, eye drops, lotions, pills, capsules or teas in quantities of up to 5 kg comprises: reading means for reading in the individual prescription data of an individual prescription; weighing means for weighing the quantities of the raw materials required for preparing the read-in individual prescription; mixing means, in particular a stirrer having a drive and a mixing container; display means; a pharmacy-associated stock database area comprising raw material parameters of the pharmaceutical raw materials available in the pharmacy and for at least one raw material identification parameter, an associated raw material parameter, as well as processing device identification parameters of the processing devices available in the pharmacy; a preparation database comprising composition information, which allocates the respectively contained raw materials and the respective proportions thereof to a plurality of individual formulations, as well as preparation information, which comprises, for each contained individual formulation, preparation information such as processing devices, time period and procedure parameters of the raw materials to be mixed; and a data processing unit adapted to have access to data in the pharmacy-associated stock database area and access to data in the preparation database; such that, by accessing the preparation database, the raw materials required for preparing the individual prescription and the respective quantities thereof as well as the time period, the processing devices and the procedure parameters of the mixing procedure can be determined for the read-in individual prescription data of an individual prescription; and that, by accessing the pharmacy-associated stock database area, by comparing the raw materials required for preparation and the respective quantities thereof to the available raw materials, it can be determined whether the individual prescription can be prepared, and that, if the individual prescription can be prepared, processing instructions for preparing the individual formulation, which contain the information about the required raw materials, the respective quantities thereof, the required processing devices as well as the time period, and the procedure parameters of the mixing procedure, can be output to a user.

In its broadest aspect, a pharmacy formulation preparation system according to the invention for preparing individual pharmaceutical formulations such as formulations for ointments, semisolid preparations, eye drops, lotions, pills, capsules or teas in quantities of up to 5 kg comprises: reading means for reading in the individual prescription data of an individual prescription; weighing means for weighing the quantities of the raw materials required for preparing the individual prescription; mixing means, in particular a stirrer having a drive and a mixing container; display means; a data processing unit adapted to have access to data in a pharmacy-associated stock database area comprising raw material identification parameters of the pharmaceutical raw materials available in the pharmacy, as well as, for at least one raw material identification parameter, an associated raw material quantity parameter and comprising processing device identification parameters of the processing devices available in the pharmacy; have access to a preparation database comprising composition information, which allocates the respectively contained raw materials and the respective proportions thereof to a plurality of individual formulations, as well as preparation information, which comprises, for each contained individual formulation, preparation information such as processing devices, time period and procedure parameters of the raw materials to be mixed; and that, by accessing the preparation database, the raw materials required for preparing the individual prescription and the respective quantities thereof as well as the time period, the processing devices and the procedure parameters of the mixing procedure can be determined for the read-in individual prescription data of an individual prescription; that, by accessing the pharmacy-associated stock database area, by comparing the raw materials required for preparation and the respective quantities thereof to the available raw materials, it can be determined whether the individual prescription can be prepared; and that, if the individual prescription can be prepared, processing instructions for preparing the individual formulation, which comprise information about the required raw materials, the respective quantities thereof, the required processing devices as well as the time period, and the procedure parameters of the mixing procedure, can be output to a user. The pharmacy-associated stock database area and the preparation database do not, in this broadest aspect of the invention, constitute part of the pharmacy formulation preparation system; the data processing unit of the pharmacy formulation preparation system only accesses it.

According to a basic concept of the invention, all information required for preparing the individual formulations is automatically available to the pharmacist in a pharmacy-associated stock database area and a preparation database. The pharmacy-associated stock database area contains data indicating the raw materials and processing devices available in the pharmacy. The preparation database contains the composition information and preparation information. The preparation database is a knowledge database providing information regarding the composition and preparation of the individual formulations to be prepared by the pharmacist.

The data of the pharmacy-associated stock database area may be data sets, wherein there might be one raw material data set for each present raw material, which comprises a raw material identification parameter, a raw material quantity parameter, optionally, the designation of the raw material and an expiration date, and wherein for each present processing device, there may be one processing device data set comprising one processing device identification parameter and, optionally, the designation of the processing device.

The data of the preparation database may be data sets, wherein there might be one data set for each individual formulation, which comprises the composition information, in particular the respectively contained raw materials as well as the respective quantities thereof; the preparation information, such as processing devices, time period and procedure parameters of the raw materials to be mixed; and, optionally, additional information for a plausibility check, e.g. for incompatibilities and further processing instructions.

The pharmacy formulation preparation system according to the invention provides a consistent and reproducible quality when preparing the individual formulation. Differences between the preparation procedures of the individual formulations due to differing knowledge of individual pharmacists can be avoided in a reliable manner.

Such pharmaceutical individual formulations prepared according to the invention may be formulations for ointments, semisolid preparations, eye drops, lotions, pills, capsules or teas. These are prepared in quantities of up to 5 kg, preferably up to 1 kg, as is typical for pharmacies.

The pharmacy formulation preparation system according to the invention allows for a fully automatic preparation of individual pharmaceutical formulations, beginning with the pharmacist or user receiving the individual formulations up to the pharmacist or user giving the individual formulation to the customer or the consumer.

The data processing unit's access to data in the pharmacy-associated stock database area allows for the data processing unit to always have up-to-date information about the raw materials and processing devices available in the pharmacy.

The data processing unit's access to data in the preparation database ensures that the pharmacist can resort to a plurality of already verified individual formulations. The required raw materials and the respective quantities as well as time period, the processing devices and the procedure parameters of the mixing procedure can be determined in a fast and automated manner. This makes it possible to reduce the time required for preparing the individual formulation and thus to make the individual formulation available to the consumer shortly after taking the individual prescription.

This reduces the work of the pharmacist, avoids the dependence on expert knowledge and spares the pharmacist from manually looking up information.

In particular, centralized storing of data in the preparation database creates a quality standard such that each pharmacy accesses the same data, which allows for individual formulations to be prepared in many places with the same quality.

In addition, it is possible to identify in a faster and more reliable manner whether an individual formulation can be prepared immediately or whether raw materials or processing devices required to this end are missing and must be re-ordered. The time for completing the individual formulation can be specified in a very fast and accurate manner.

Furthermore, it is possible to document that, at the time of preparation, the individual formulation is prepared according to the currently applicable guidelines, thereby avoiding returns or complaints.

By continuously updating the data in the pharmacy-associated stock database area and in the preparation database, the use of outdated formulations or outdated raw materials can be avoided in a reliable manner.

The reading means can be adapted as an optical reading means, such as a scanner, for example a barcode scanner or a scanner with automatic writing recognition, or as a camera with automatic writing recognition; as a manual reading means, such as a keyboard, a touchscreen or a mouse; or an acoustical reading means such as a microphone with voice recognition.

By using an automatic reading means, such as an optical reading means, it is possible to avoid the input of human mistakes into the system, thereby ensuring that the prepared individual formulation corresponds to the individual prescription.

The weighing means makes it possible to weigh the quantities of the required raw materials such that the composition of the individual formulation corresponds to the individual prescription and the contents are thus appropriately tailored to the consumer.

The display means makes it possible to provide the user of the pharmacy formulation preparation system with information about the preparation procedure at any time.

In one embodiment of the invention, the weighing means is coupled to the display means such that the display means displays to the operator the required raw materials as well as the respectively required quantity, thereby reliably avoiding both the addition of wrong raw materials and the incorrect portioning of the raw materials.

The mixing means makes it possible to mix the raw materials in the individual formulations. By blending the raw materials in a sterile container using a sterile mixing instrument, the presence of germs in the individual formulation can be reduced to a minimum.

According to the present invention, the term "mixing" is considered to include the following actions: dissolving, dispersing, suspending, emulsifying, filtrating, agitating, stirring, blending, adding, preparing, manufacturing, compounding, intermixing, interspersing, admixing.

Processing devices are considered apparatus for preparing pharmaceutical formulations and include accessories such as stirring instruments, blending containers and further accessories that can be used together with the mixing means.

According to a first embodiment of the invention, the data processing unit is adapted such that, if a required raw material is found to be no longer present or no longer present to a sufficient extent, a respective message can be output to the user or an electronic order message can be sent.

This makes it possible to, if a required raw material is missing, quickly identify that the individual formulation cannot immediately be prepared. In addition, the missing raw materials can be ordered automatically, thereby reducing work and enhancing usability and efficiency.

As another embodiment of the invention, the pharmacy-associated stock database comprises, for at least one raw material identification parameter, one allocated raw material shelf-life parameter, thereby determining the shelf-life for each raw material in the pharmacy formulation preparation system itself, which allows for consistently controlling, in a current and automated manner, whether the present raw materials can still be processed.

In another embodiment of the invention, the pharmacy-associated stock database comprises, for at least one raw material identification parameter, an allocated raw material preparation date, wherein the composition information of the preparation database for at least one raw material comprises one allocated shelf-life, and wherein the data processing means is further adapted such that, by comparing the shelf-life to the raw material preparation date plus the current date for a raw material of the individual prescription, it can be determined whether this raw material can still be used and whether the individual formulation can still be prepared.

This makes it possible to centrally create a standard for the shelf-life of each individual raw material by means of the preparation database, the compliance to which standard is verified by the pharmacy-associated stock database area itself. This further reduces the pharmacist's work and also allows for consistently controlling, in a current and automated manner, whether the present raw materials can still be processed.

Furthermore, it is possible to document at the time of preparing the individual formulation that the raw materials can well be used, thereby avoiding reclamations/returns or complaints.

According to another embodiment of the invention, the data processing unit is adapted such that, if a required raw material is found to be no longer usable, a respective message can be output to the user or an electronic order message can be sent.

Such notifications or electronic order messages allow for automated stock maintenance in the pharmacy and guarantee an automated order procedure, thereby reducing work and further enhancing usability and efficiency.

As another possible embodiment, the pharmacist can be notified in due time, by means of the pharmacy formulation preparation system, if a raw material is missing or about to run out. For this purpose, minimum stock values in the pharmacy formulation preparation system, in particular in the pharmacy-associated stock database area, may be stored and compared to the existing quantities of raw materials. If the quantity of a raw material falls below the minimum stock value, a respective message can be output to a user or an electronic order message can be sent, thereby reducing the pharmacist's work and further enhancing usability and efficiency. Moreover, this avoids the eventuality that an individual formulation can, shortly after, no longer be prepared due to the lack of one or more raw materials.

In another embodiment of the invention, the preparation database further comprises plausibility check information, in particular combinations of incompatible raw materials or raw materials incompatible with a certain person or an indication of incompatible raw materials, wherein the data processing unit is further adapted to allow for a plausibility check to be performed, in which the raw materials determined as required for the preparation and the respective quantities thereof can be compared to at least part of the plausibility check information.

By storing this plausibility check information in the preparation database, an additional security check is performed such as to avoid mistakes resulting from the individual prescription when preparing individual formulations. By providing such plausibility check information in the preparation database in a centralized manner, the quality standard created by the pharmacy formulation preparation system according to the present invention is further improved.

According to another embodiment of the present invention, a labeling means is provided, in particular a label printer, which is able to print information about the prepared individual formulation. This makes it possible to provide the consumer with relevant information about the individual formulation together with the individual formulation, in particular information about the individual formulation such as components, compatibilities or application instructions.

If the mixing means is adapted as a mixing and stirring means comprising a fastening means for a container, in particular having an inner volume ranging from 10 ml to 5000 ml, preferably a container for up to 1000 ml; if applicable, a lifting unit; a stirring stick; and an electric motor for driving the stirring stick in a rotating manner, with a stirring instrument being attached or attachable to the stirring stick; then individual formulations can be prepared in an automated manner.

In another embodiment, the mixing means may be provided with a cooling device or a heating device, as well as a sieving, shaking or embedding device, thereby ensuring high flexibility when preparing the individual formulations.

Accordingly, the usage of this mixing means makes it possible to prepare any kind of semisolid preparations, eye drops, lotions, pills, capsules or teas.

According to another embodiment of the present invention, the pharmacy-associated stock database area may be part of a pharmacy-internal stock database or form a pharmacy-internal stock database. The pharmacy-internal stock database may be stored on the pharmacy-internal computer, especially on the computer that also contains the data processing unit.

In this embodiment, the stock data is locally available in the pharmacy and can be accessed without Internet access.

According to another embodiment of the pharmacy formulation preparation system, according to the invention, the pharmacy-associated stock database area is part of the preparation database.

In this embodiment, all data is stored in the preparation database, which is usually located in a remote place but may also be designed to be located within the pharmacy or in a distributed manner. This data can be accessed by the pharmacy's computer via a network or the Internet.

The data may be protected by a username and password such that only authorized persons have access to the data, in particular to the pharmacy-associated stock database area.

According to another embodiment, the pharmacy formulation preparation system according to the invention is adapted such that, if the preparation database is stored on a server, in particular on a server located remotely from the pharmacy-associated computer, the data processing unit can access the preparation database via a data connection.

This ensures that the preparation data is stored in a centralized manner and independent of a computer system in the pharmacy. By using backup copies and a backup server, the loss of data can be avoided, thereby rendering the system default-free and reliable.

The invention also concerns an arrangement of a plurality of pharmacy formulation preparation systems of the herein described type, wherein the pharmacy formulation preparation systems, except for the preparation database, are provided separately from each other and wherein their data processing units are adapted to have access to data in a common preparation database comprising composition information, which allocates the respectively contained raw materials to a plurality of individual formulations, as well as the proportions thereof; as well as preparation information, which comprises, for each contained individual formulation, preparation information about processing devices, time periods and procedure parameters of the raw materials to be mixed.

In such an arrangement according to the invention, a common preparation database is used by a plurality of pharmacy formulation preparation systems, thereby ensuring that individual formulations from different pharmacies are prepared according to the information in the preparation database and always comply with the same quality requirements.

The pharmacy-associated stock database areas of the pharmacy formulation preparation systems may either be provided locally on the computers of the respective pharmacy or, as an alternative, the pharmacy-associated stock database areas may be provided remotely from the respective pharmacy, and in particular may be integrated in the preparation database or linked thereto.

The above described advantages and embodiments of the pharmacy formulation preparation system apply equally to the arrangement of several pharmacy formulation preparation systems according to the invention of the herein described type. In order to avoid repetitions, these are not mentioned again.

The invention also concerns a pharmacy formulation preparation system for preparing individual pharmaceutical formulations such as ointments, semisolid preparations, eye drops, lotions, pills, capsules or teas in quantities of up to 5 kg, preferably up to 1 kg, comprising the following steps: reading in the individual formulation data of the individual formulation; determining, by accessing a preparation database, the raw materials required for preparing the individual prescription and the respective quantities thereof as well as the time period, the processing devices and the procedure parameters of the mixing procedure, wherein the preparation database comprises composition information, which allocates the respectively contained raw materials as well as the proportions thereof to a plurality of individual formulations, as well as preparation information, which comprises preparation information such as processing devices, time period and procedure parameters of the raw materials to be mixed for each contained individual formulation; determining, by accessing a pharmacy-associated stock database area, by comparing the raw materials required for the preparation and the respective quantities thereof to the available raw materials, whether the individual prescription can be prepared, wherein the pharmacy-associated stock database area comprises raw material identification parameters of the pharmaceutical raw materials available in the pharmacy as well as, for at least one raw material identification parameter, an associated raw material quantity parameter as well as the processing devices and identification parameters of the processing devices available in the pharmacy; outputting, if the individual prescription can be prepared, processing instructions for preparing the individual formulations comprising information about the required raw materials, the respective quantities thereof, the required processing devices as well as the time period and the procedure parameters of the mixing procedure to a user; weighing the quantities of the raw materials required for the read-in individual prescription; and mixing them to render the individual formulation.

The above described advantages and embodiments of the pharmacy formulation preparation system apply equally to the arrangement of several pharmacy formulation preparation systems according to the invention of the herein described type. In order to avoid repetitions, these are not mentioned again.

According to an embodiment of the pharmacy formulation preparation method, it further comprises the step of outputting a respective message to a user or sending an electronic order notification if a required raw material is found to be no longer present or no longer present to a sufficient extent.

Such messages or electronic order notifications ensure an automated order procedure, thereby reducing work and further enhancing usability and efficiency.

According to another embodiment, the pharmacy-associated stock database comprises, for at least one raw material identification parameter, an associated raw material preparation date, and the composition information of the preparation database comprises, for at least one raw material, an associated shelf-life. By comparing the shelf-life to the raw material preparation date plus the current date for a raw material of the individual formulation, it is further determined whether this raw material can still be used and whether the individual formulation can still be prepared.

This makes it possible to centrally create, by means of the preparation database, a standard for the shelf-life of each individual raw material, the compliance to which standard is verified by the pharmacy-associated stock database area itself. This further reduces the pharmacist's work and also allows for consistently controlling, in a current and automated manner, whether the present raw materials can still be processed.

Furthermore, it is possible to document, at the time of preparing the individual formulation, that the raw materials used can well be used, thereby avoiding reclamations or complaints.

According to another embodiment of the invention, the method according to the invention further comprises the step of outputting, if a required raw material is not usable anymore, a respective message to the user or sending an electronic order message.

Such messages or electronic order notifications allow for automated stock maintenance in the pharmacy and guarantee an automated order procedure, thereby reducing work and further enhancing usability and efficiency.

In another embodiment of the method according to the present invention, the preparation database further comprises plausibility check information, in particular combinations of incompatible raw materials or raw materials incompatible with a certain person, or an indication of incompatible raw materials, the method further comprising the step of running a plausibility check, in which the raw materials determined as required for the preparation and the respective quantities thereof can be compared to at least part of the plausibility check information.

An additional security check is performed such as to avoid mistakes resulting from the individual prescription when preparing the individual formulation. By providing such plausibility check information in the preparation database in a centralized manner, the quality standard created by the pharmacy formulation preparation system according to the invention is further improved.

In addition to mixing, the following actions for preparing individual formulations may also be performed: melting, pestling, grinding, sieving, soaking, heating, cooling, emulsifying, reacting, cold-stirring, weighing, pouring, refilling, embedding, pressing, wetting, granulating, sterilizing, retarding, pelleting, checking, homogenizing, bottling or refilling.

BRIEF DESCRIPTION OF THE DRAWINGS

The invention is explained below in more detail by way of example embodiments and with reference to the accompanying drawings.

DETAILED DESCRIPTION

Figure 1:
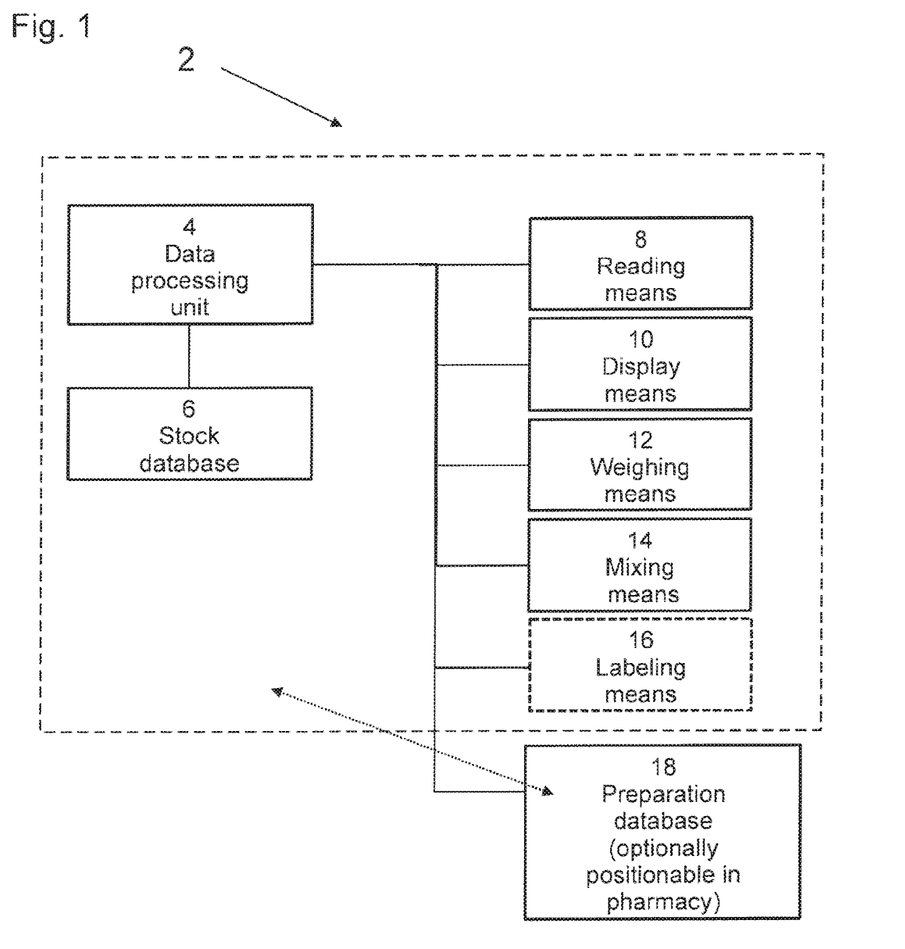
FIG. 1 shows a schematic view of a first pharmacy formulation preparation system according to a first embodiment of the present invention.

FIG. 1 shows a schematic view of a first pharmacy formulation preparation system according to a first embodiment of the present invention;

The first pharmacy formulation preparation system 2 comprises a data processing unit 4, a stock database 6, reading means 8, display means 10, weighing means 12, mixing means 14, optional labeling means 16 and a preparation database 18.

The area represented by a dashed line in FIG. 1 comprises those elements of the first pharmacy formulation preparation system 2 which are provided within the pharmacy, those elements being elements 4 to 16.

The preparation database 18 is located remotely from the pharmacy and the data processing unit 4 accesses the data in the preparation database 18 via a suitable network connection, for example via the Internet. Thereby, all contents of the preparation database 18 are stored in a centralized manner and remotely from the pharmacy and are kept available for access by the data processing unit 4 of the first pharmacy formulation preparation system 2 as well as for further pharmacies not shown herein.

The contents of the stock database 6 and the preparation database 8 as well as the functioning of the database processing unit 4 are explained below in more detail with reference to FIGS. 3 to 6.

The reading means 8 is in the present embodiment adapted as a scanner with automatic writing recognition, which is able to automatically read in individual prescriptions. As an alternative, the reading unit 8 may also be adapted as a camera with automatic writing recognition; as a manual reading means, such as a keyboard, a touchscreen or a mouse; or an acoustical reading means such as a microphone with voice recognition.

The display means 10 can display to the pharmacist information about the preparation of an individual formulation based on the individual formulation at any time.

The weighing means 12 may be adapted as a simple scales or as a specific lab or analysis scales that the pharmacist can use to weigh the respectively required raw materials in the respective quantities. The weighing means 12 may advantageously be coupled to the display means 10 such as to perform the weighing in a computer-assisted or display-assisted manner. As an alternative, the raw materials may also be weighed manually.

Figure 8:
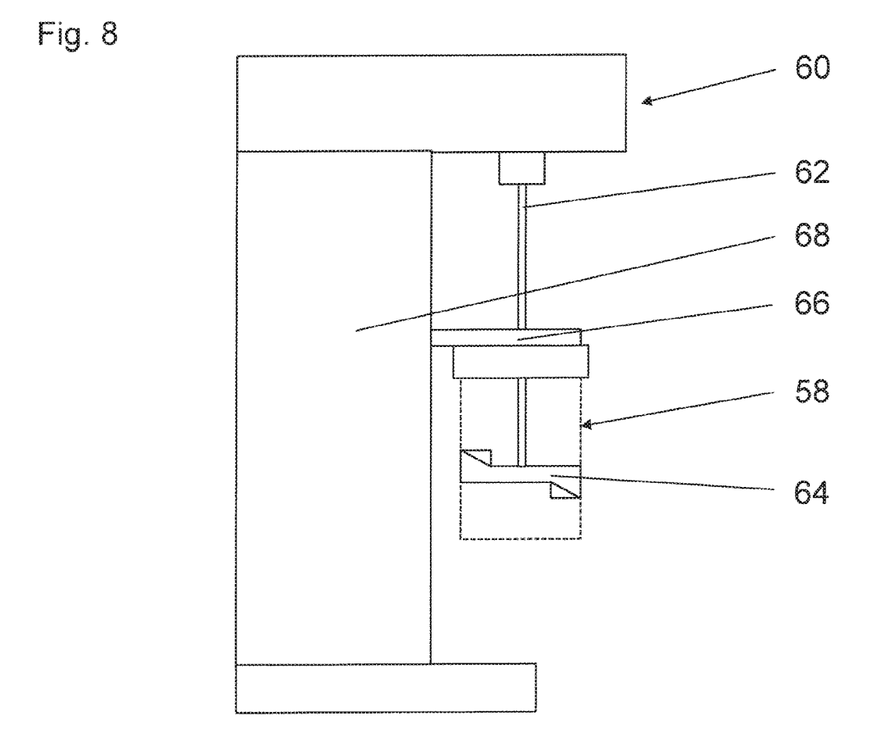
FIG. 8 shows a schematic presentation of a mixing and stirring unit according to the other embodiment of the present invention.

The mixing means 14 is adapted such that the raw materials can be blended as desired to render the individual formulation. An example for such mixing means is illustrated in FIG. 8, which is, however, to be understood merely as an example and not as a limitation.

The labeling means 16 may for example be adapted as a label printer which prints information about the prepared individual formulation on a label. Thereby, the relevant information about the individual formulation can be provided to the consumer together with the individual formulation, for example information about the individual formulation itself, its components, compatibilities, application instructions, minimum expiration date, name of the manufacturer and further information.

The data processing unit 4 and the stock database 6 may be provided on a pharmacy-internal computer. The stock database 6 may also be adapted as a stock database area of a database on the pharmacy-internal computer. The pharmacy-internal computer may also be a computer integrated into the mixing means.

The data processing unit 4 is connected to elements 6 to 18 and adapted to be able to access the stock database 6 and the preparation database 18 in order to receive data from the reading means 8 and/or the weighing means and to control the display means 10, the mixing means 14 and/or the labeling means 16.

Figure 2:
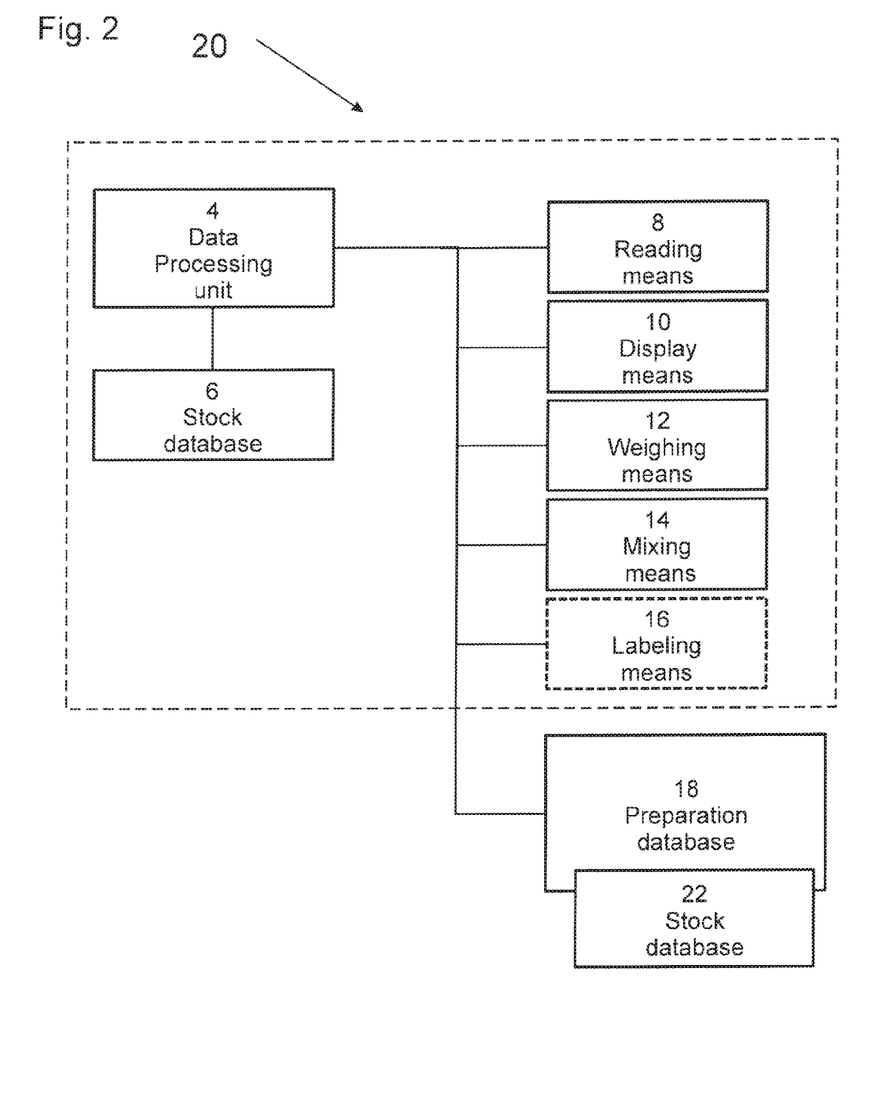
FIG. 2 shows a schematic view of a second pharmacy formulation preparation system according to another embodiment of the present invention.

FIG. 2 shows a schematic view of a second pharmacy formulation preparation system according to another embodiment of the present invention;

The second pharmacy formulation preparation system 20 substantially corresponds to the first pharmacy formulation preparation system 2 of FIG. 1, with the stock database 22 not being provided within the pharmacy but externally and being integrated into the preparation database 18.

Thereby, all contents of the stock database 22 and the preparation database 18 are stored in a centralized manner and remotely from the pharmacy and are kept available for access by the data processing unit 4 of the second pharmacy formulation preparation system 20 as well as for further pharmacies not shown herein.

If several pharmacies access the preparation database 18, areas of the preparation database might be allocated to individual pharmacies such that only the respective pharmacies are able and allowed to access it.

Figure 3:
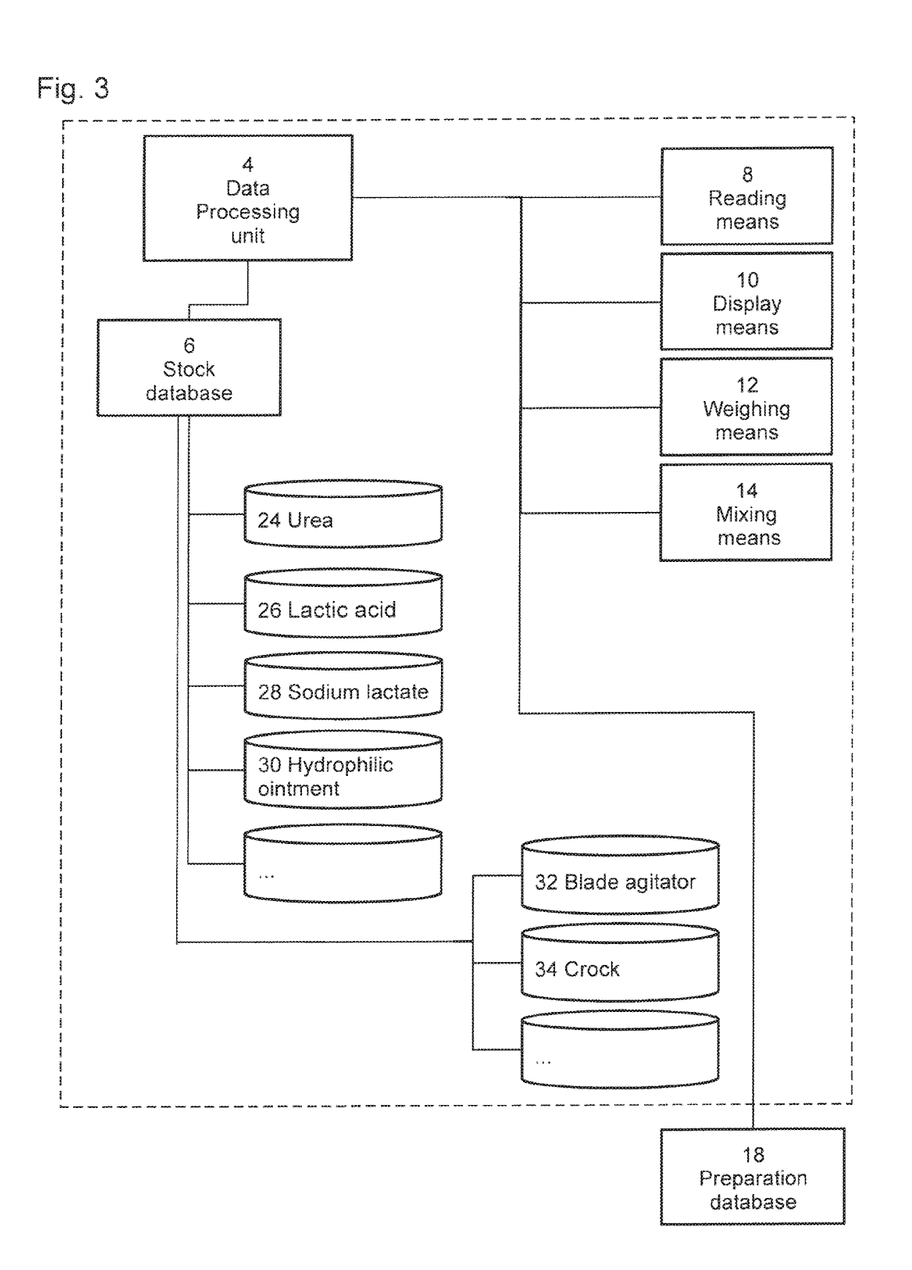
FIG. 3 shows the schematic view of the first pharmacy formulation preparation system of FIG. 1 and additionally shows the present raw materials and processing devices by way of example.

FIG. 3 shows a schematic view of the first pharmacy formulation preparation system 2 and additionally shows, by way of example, the present raw materials and processing devices;

According to FIG. 3, the pharmacy that is equipped with the pharmacy formulation preparation system 2 according to the invention has a raw material storage containing a number of raw materials required for preparing common individual pharmaceutical formulations, of which FIG. 3 shows the raw material: urea 24, the raw material: lactic acid 26, the raw material: sodium lactate 28 and the raw material: hydrophilic ointment 30. It is also indicated that more raw materials may be present or are present, which are, however, not relevant for the present embodiment.

Moreover, the pharmacy is equipped with a number of processing devices, by means of which the individual formulations can be prepared. As an example, FIG. 3 shows a blade agitator 32 and a crock 34 and it is indicated that many more such processing devices may be present or are present.

Figure 4:
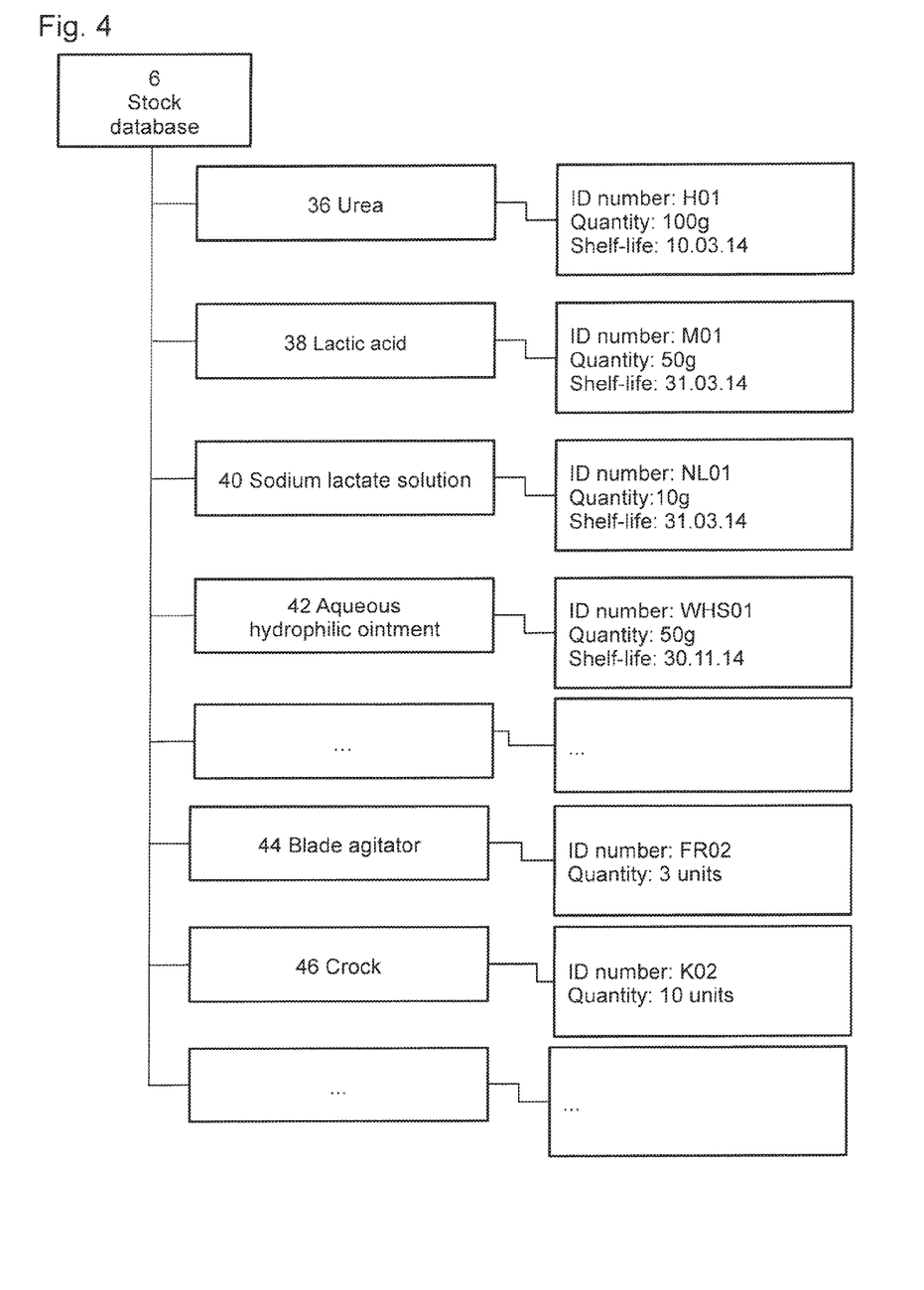
FIG. 4 shows a schematic presentation of the information contained in the stock database of the pharmacy formulation preparation system of FIGS. 1-3.

FIG. 4 shows a schematic presentation of the information contained in the stock database 6 of the pharmacy formulation preparation systems 2 and 20;

According to FIG. 4, a data set for each present raw material and for each present processing device is stored in the stock database 6.

Each raw material data set 36 to 42 contains the designation of the respective raw material, a raw material identification parameter, a raw material quantity parameter, and a raw material shelf-life parameter.

Each processing device data set 44, 46 contains the designation of the respective processing device and an associated processing device identification parameter.

The stock database 6 has thus stored therein the stock of the raw material storage available in the pharmacy, including the quantity and the shelf-life of the individual raw materials, and the stock of processing devices available in the pharmacy.

Figure 5:
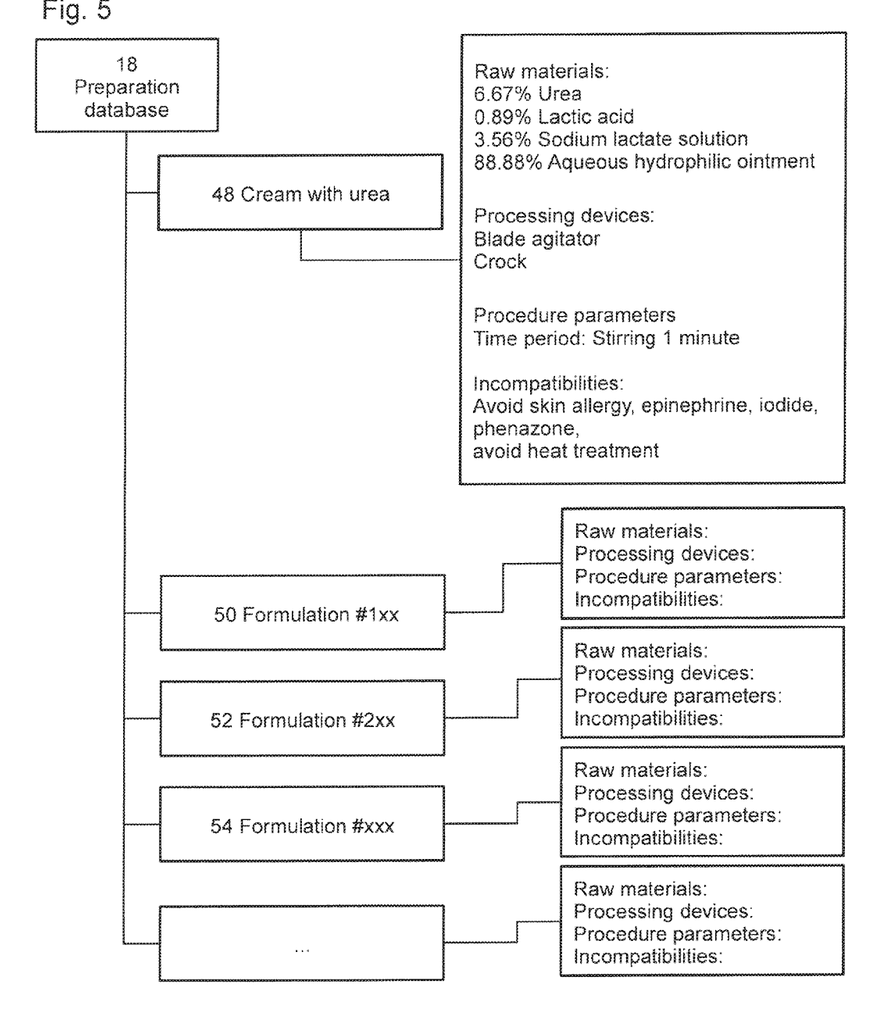
FIG. 5 shows a schematic presentation of the information contained in the preparation database of the pharmacy formulation preparation system of FIGS. 1-3.

FIG. 5 shows a schematic presentation of the information contained in the preparation database of the pharmacy formulation preparation system of FIGS. 1-3;

According to FIG. 5, the preparation database 18 has stored therein data sets for a plurality of individual formulations. Each data set contains the designation of an individual formulation, information about the raw materials required for preparing this individual formulation and the proportions thereof, preparation information about the required processing devices and procedure parameters of the raw materials to be mixed, as well as, if applicable, additional information for a plausibility check, e.g. for incompatibilities and further processing instructions.

The data set "cream with urea" 48 contains the raw materials urea, lactate acid, sodium lactate and aqueous hydrophilic ointment as materials required for the preparation and the proportions thereof as 6.67%/0.89%/3.56%/88.88%. Furthermore, the data set "cream with urea" 48 contains the processing devices required for the preparation, namely a blade agitator and crock; the procedure parameters, namely stirring for one minute; as well as indicated incompatibilities and further application indications, namely to avoid skin allergies, epinephrine, jodide, phenzone and heat application.

For a plurality of further individual formulations, which are hereinafter not individually specified for the sake of simplicity, the designation of the individual formulation, the raw materials and the proportions thereof, the processing devices, the procedure parameters and additional information are also stored.

Figure 6:
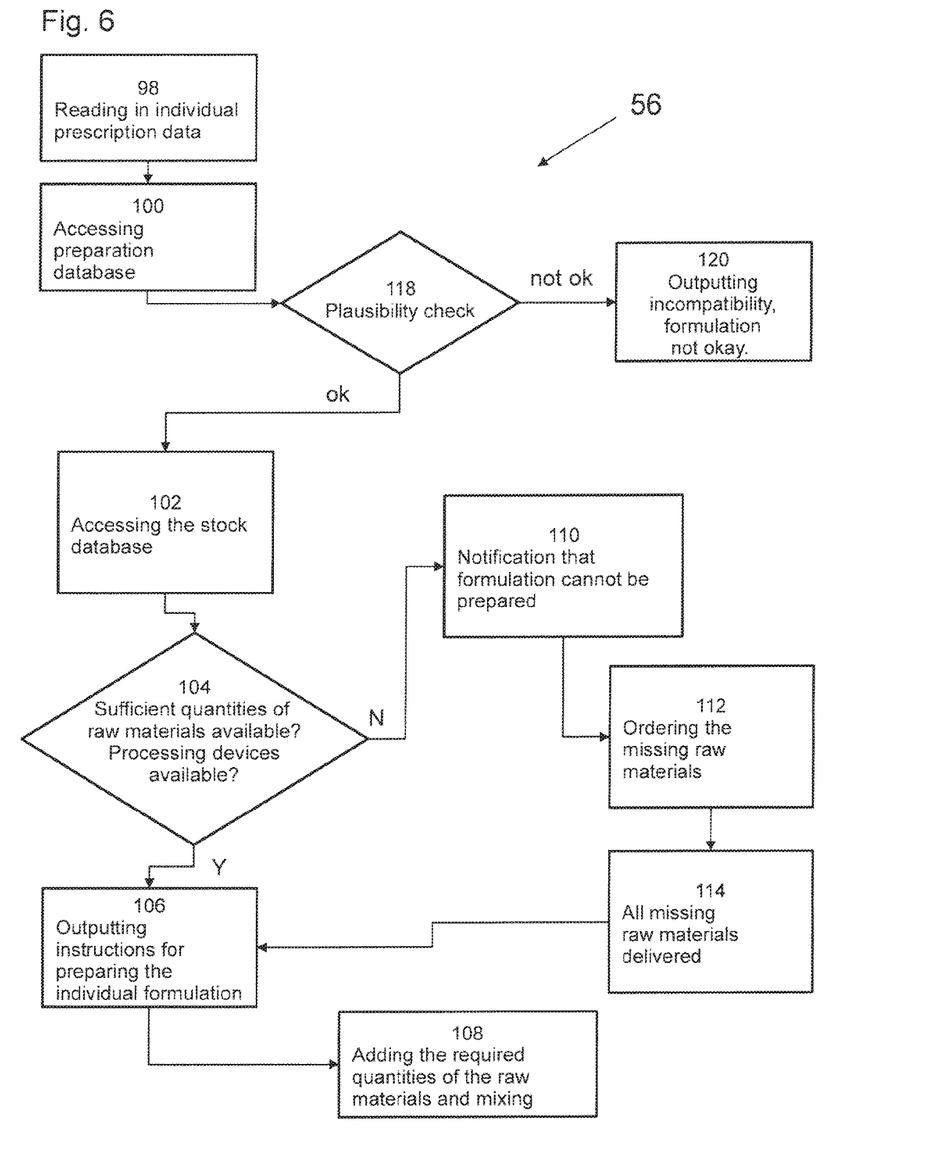
FIG. 6 shows a flowchart of a pharmacy formulation preparation method according to the other embodiment of the present invention.

FIG. 6 shows a flowchart of a pharmacy formulation preparation method 56;

According to FIG. 6, in method step 98, first, an individual prescription with its individual prescription data is read in by the reading unit 8. In the following embodiment, the prescription reads: "Cream with urea, 100 g".

The data processing unit 4 captures this individual prescription and runs a query in the preparation database 18 as to whether it contains a data set "cream with urea", and if so, accesses this data set (method step 100). In the present description, it does contain a respective data set, namely the data set 48 "cream with urea", which is accessed by the preparation database 18.

Subsequently, method step 118 may comprise an optional plausibility check. For example, if the individual prescription specifies, together with the specification "cream with urea, 100 g", the respectively required raw materials and mixing ratios or the diagnosis and the usage purpose, a plausibility check may be run as follows. The raw materials specified on the individual prescription may be compared to the raw materials contained in the preparation database 18, and in cases of greater deviations, in particular in cases of raw materials deviating from each other, an error message may be output by the display means 10, according to which the cream with urea is, according to the preparation database 18, to be prepared in a different manner (method step 120). Also if, for example, in an extreme case, cream with urea was accidentally prescribed for treating a skin allergy, whereas the data set "cream with urea" 48 expressly indicates the incompatibility of this individual formulation with skin allergies, an error message might be output by the display means 10 to the pharmacist (method step 120).

The plausibility check 118 may differentiate between situations in which the determined deviation causes an unsolvable problem, and situations in which the problem can be solved in an easy manner.

If the result of the plausibility check 118 is positive, the data processing unit 4 proceeds, in method step 102, by accessing the stock database 6. If a deviation determined in the plausibility check 118 can be solved in an easy manner, the procedure may also proceed with method step 102.

In method step 104, it is checked whether sufficient quantities of the raw materials that are, according to the data set 48, required for preparing cream with urea, are available in the pharmacy's raw material storage, as indicated by the stock database 6. Based on the quantity 100 g on the read-in individual prescription and on the quantities in the data set 48, the data processing unit 4 determines that the preparation of 100 g cream with urea requires 6.67 g urea, 0.89 g lactate acid, 3.56 g sodium lactate and 88.8 g aqueous hydrophilic ointment. The data processing unit 4 now runs a query in the stock database 6. According to the data sets 36, 38 and 40, the availability of the urea, the lactate acid and the sodium lactate is sufficient, but checking the data set "aqueous hydrophilic ointment" 42 of the stock database 6 reveals that there is only 50 g left, which is not sufficient to prepare 100 g cream with urea.

Method step 104 also comprises a check to ascertain whether the processing devices required for preparing the individual formulation "cream with urea" are available in the stock database 6. Since, according to the data set 48 "cream with urea", a blade agitator and a crock are required as processing devices and, since these are, according to the data sets 44 and 46 of the stock database 6, available, the result of this check will be positive. Mixing means, in particular a stirrer having a drive, are available anyway.

Method step 104 may also consist of two parts such that the availability of the raw materials and the availability of the processing devices can be checked independently of each other.

Due to the lack of sufficient raw material "aqueous hydrophilic ointment", in method step 110, a notification from the display means 10 is output to the pharmacist stating that the individual formulation "cream with urea" can presently not be prepared and, in method step 112, the missing raw material "aqueous hydrophilic ointment" is ordered. This may be either by the pharmacist manually placing the respective order or in an automated manner, in which case an automated order message is sent to the supplier.

After delivering the missing raw materials according to method step 114, the preparation of the individual formulation "cream with urea" can be continued according to method step 106.

If the stock database 6 indicated that the stock value for the raw material "aqueous hydrophilic ointment" available in the pharmacy's raw material storage was, instead of the quantity 50 g in the data set 42, a quantity of 100 g or more, the result of the check in method step 104 would be positive and the procedure would proceed immediately with method step 106.

In method steps 106 and 108, the individual formulation is prepared either in a fully automated manner, a semi-automated or manual manner, a computer-assisted or a display-assisted manner. Tea mixtures may, e.g., be prepared in a manual manner.

For this purpose, first, the processing device's blade agitator and crock are installed in mixing means 14, then, the raw materials are subsequently weighed in the quantities specified above and placed in the crock. Finally, the raw materials are mixed using the procedure parameter: one minute stirring.

Eventually, the labeling means 16 may print a label.

In another embodiment, the data sets 36 to 42 may optionally be provided with an expiration date for the raw materials in the raw material storage, thereby allowing for automatically controlling, by the data processing unit 4, whether the present raw materials can still be used or must be replaced.

According to another embodiment, the data sets 36 to 42 of the stock database 6 only comprise the preparation times for the respective raw materials and the shelf-life results from the data sets 48 to 54 of the preparation database 18 such that, at a suitable point in time, e.g. in method step 104, it may be checked whether the raw materials can still be used or must be replaced.

Figure 7:
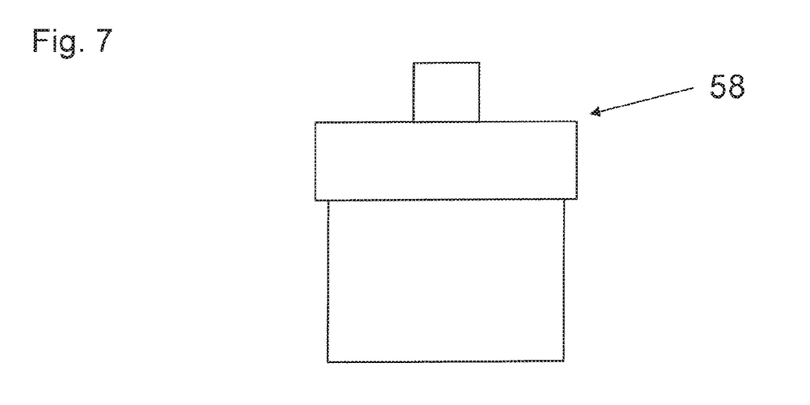
FIG. 7 shows a schematic presentation of a container having raw materials placed thereinto according to another embodiment of the present invention.

FIG. 7 shows a typical container 58, which the raw materials to be mixed are placed into and blended. This container 58 includes a closable lid.

FIG. 8 shows a typical mixing and stirring unit 60 having a solid foot, a central basic body and a top portion protruding to the front, wherein a drive shaft 62 extends from the front area of the top portion downwards, having in the present embodiment, the required blade agitator 64 attached thereto. Instead of this blade agitator 64, other stirring instruments may also be attached to the lower end of the drive shaft 62.

Furthermore, the mixing and stirring unit 60 is provided with fastening means 66 for a container, which can be moved downwards and upwards by means of a lifting unit 68 not shown herein provided in the central body of the mixing and stirring unit 60.

Moreover, the mixing and stirring unit 60 may be provided with display means not shown herein and weighing means not shown herein. The weighing means may also be embodied by respective sensors on the fastening means 66 and the lifting unit 68.

The pharmacy-internal computer having the data processing unit 4 and, if applicable, the stock database area 6, in the case that it is located in the pharmacy, may either be directly integrated into the mixing and stirring unit 60 or may be embodied separately from the mixing and stirring unit 60 and connected thereto.

For all possible further embodiments, reference is made to the above description.

In operation, the crock 68 and the blade agitator 64, as displayed by the display means, are provided or mounted to the mixing and stirring unit 16. Then, the required quantities of the raw materials are weighed and placed therein, as displayed by the display means. Then, the crock 68 is moved upwards into the mixing position and the mixing procedure is started according to the prescribed procedure parameters. Subsequently, the mixing procedure of the individual formulation is completed.

The invention claimed is:

1. A pharmacy formulation preparation system for preparing pharmaceutical individual formulations such as formulations for ointments, semisolid preparations, eye drops, lotions, pills, capsules or teas in quantities of up to 5 kg, comprising:

reading means for reading in the individual prescription data of an individual prescription;

weighing means for weighing the quantities of the raw materials required for a read-in individual prescription;

mixing means, wherein the mixing means is adapted as a mixing and stirring unit comprising fastening means for a container having an inner volume of 10 ml to 5000 ml, a lifting unit, a stirring stick and an electric motor for driving the stirring stick in a rotating manner, the stirring stick having a stirring instrument attached or attachable thereto;

display means;

a pharmacy-associated stock database area comprising raw material identification parameters of the pharmaceutical raw materials available in the pharmacy as well as for at least one raw material identification parameter, an associated raw material quantity parameter and comprising processing device identification parameters of the processing devices available in the pharmacy;

a preparation database comprising composition information, which allocates the respectively contained raw materials and the respective proportions thereof to a plurality of individual formulations, as well as preparation information, which comprises, for each contained individual formulation, preparation information such as processing devices, time period and procedure parameters of the raw materials to be mixed; and a data processing unit, which is adapted:

to have access to data in the pharmacy-associated stock database area;

to have access to data in the preparation database; and such that, by accessing the preparation database, the raw materials required for preparing the individual prescription and the respective quantities thereof as well as the time period, the processing devices and the procedure parameters of the mixing procedure can be determined for the read-in individual prescription data of the individual prescription;

determining whether the individual prescription can be prepared, by accessing the pharmacy-associated stock database area, by comparing the raw materials required for the preparation and the respective quantities thereof to the available raw materials; and that, if the individual prescription can be prepared, processing instructions for preparing the individual formulation, containing the information about the required raw materials, the respective quantities thereof, the required processing devices as well as the time period and the procedure parameters of the mixing procedure, can be output to a user.

2. The pharmacy formulation preparation system according to claim 1, wherein the data processing unit is further adapted such that, if a required raw material is found to be no longer present or no longer present to a sufficient extent, a respective message can be output to a user or an electronic order message can be sent.

3. The pharmacy formulation preparation system according to claim 2, wherein the pharmacy-associated stock database area further comprises, for at least one raw material identification parameter, one associated raw material shelf-life parameter.

4. The pharmacy formulation preparation system according to claim 2, wherein the pharmacy-associated stock database area further comprises, for at least one raw material identification parameter, an allocated raw material preparation date and wherein the composition information of the preparation database comprises, for at least one raw material, an allocated shelf-life, and wherein the data processing means is further adapted such that by comparing the shelf-life to the raw material preparation date plus the current date for a raw material of the individual prescription, it can be determined whether this raw material can still be used and whether the individual formulation can be prepared.

5. The pharmacy prescription preparation system according to claim 4, wherein the data processing unit is further adapted such that, if a required raw material is found not to be usable anymore, a respective message can be output to a user or an electronic order message can be sent.

6. The pharmacy formulation preparation system according to claim 5, wherein the preparation database further comprises plausibility check information, in particular combinations of incompatible raw materials or raw materials incompatible with a certain person, or an indication of incompatible raw materials, and wherein the data processing unit is further adapted such that a plausibility check can be performed, in which the raw materials determined as required for the preparation and the respective quantities thereof can be compared to at least part of the plausibility check information.

7. The pharmacy formulation preparation system according to claim 6, wherein a labeling means is further provided, which is adapted such that information about the prepared individual formulation can be printed.

8. The pharmacy formulation preparation system according to claim 1, wherein the pharmacy-associated stock database area is part of a pharmacy-internal stock database or form a pharmacy-internal stock database and/or wherein the pharmacy-internal stock database is stored on a pharmacy-internal computer, especially on the computer that also contains the data processing unit.

9. The pharmacy formulation preparation system according to claim 8, wherein the pharmacy-associated stock database area is part of the preparation database.

10. The pharmacy formulation preparation system according to claim 9, wherein the preparation database is stored on a server, wherein the data processing unit accesses the server via a data connection.

11. An arrangement of a plurality of pharmacy formulation preparation systems according to claim 10, wherein the pharmacy formulation preparation systems, except for the preparation database, are provided separately from each other and wherein their data processing units are adapted to have access to data on a common preparation database comprising composition information, which allocates the respectively contained raw materials and the proportions thereof to a plurality of individual formulations, as well as preparation information, which comprises, for each contained individual formulation, preparation information about the processing devices, time period and procedure parameters of the raw materials to be mixed.

* * * * *